Jan. 17, 1933.  G. L. SMITH  1,894,715
AUTOMOBILE SHIELD AND GRILLE
Filed July 22, 1931
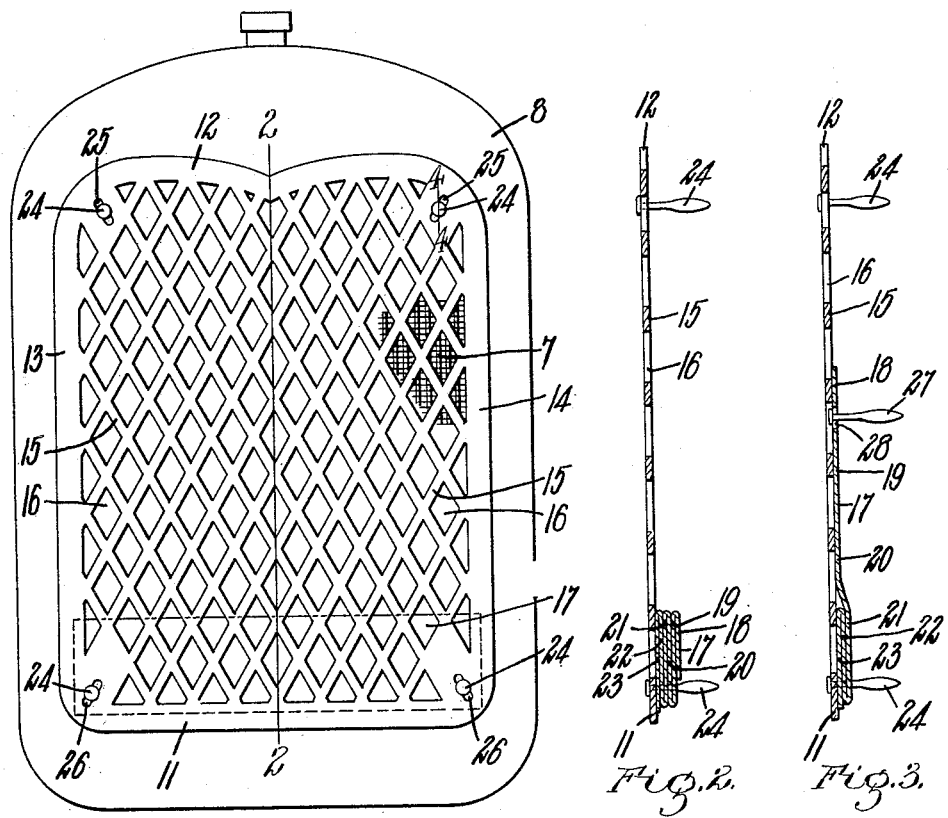
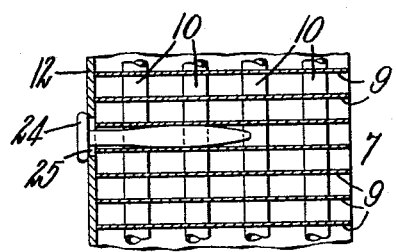
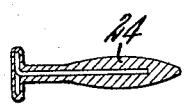
Inventor:
George L. Smith,
by Charles S. Gooding, Att'y.

Patented Jan. 17, 1933

1,894,715

UNITED STATES PATENT OFFICE

GEORGE L. SMITH, OF HYDE PARK, MASSACHUSETTS

AUTOMOBILE SHIELD AND GRILLE

Application filed July 22, 1931. Serial No. 552,386.

This invention relates to a shield for the radiators of automobiles and to the combination of said shield with a grille for the protection of said radiator.

The object of the invention is to provide a grille which is cheap and simple in its construction and is provided with means for easily and quickly attaching the grille to or detaching the same from said radiator.

The object of the invention is further to provide a shield which is also cheap in its construction and is attached to the grille and embodies a sheet of material preferably composed of strong tough paper or cardboard, which is rendered impervious to moisture and is creased transversely thereof and folded to form a plurality of sections which may be folded together at the bottom of the radiator and of the grille and which may be partially or wholly unfolded so that different areas of the radiator may be covered as may be desired.

The invention also contemplates fastening the different sections of the shield together when folded and also by the same means fastening the said sections to the radiator of the automobile and, furthermore, the sections of the shield may be unfolded so that any one of said sections may be fastened to the radiator of the automobile.

The invention consists in the combination and arrangement of parts set forth in the following specification and particularly pointed out in the claims thereof.

Referring to the drawing:—

Fig. 1 represents a front elevation of an automobile radiator and its shell with the shield and grille embodying my invention mounted in position thereon.

Fig. 2 is a sectional elevation taken on line 2—2, of Fig. 1, the shield being shown in folded position at the bottom of the radiator.

Fig. 3 is a sectional elevation taken on the line 2—2, of Fig. 1, but with the shield partly unfolded, the means for fastening the shield and the grille to the radiator being illustrated in both of said Figures 1 and 2.

Fig. 4 is an enlarged vertical section taken on line 4—4, of Fig. 1 illustrating a means for securing the grille to the radiator.

Fig. 5 is an enlarged central longitudinal section through a fastening device which is employed to secure the shield and the grille to the radiator.

Fig. 6 is an end elevation of said fastening device.

Like numerals refer to like parts in the several views of the drawing.

In the drawing 7 is an automobile radiator of conventional form and 8 is a shell which is mounted upon said radiator and encloses the edge portions thereof. The radiator 7 may be of any well-known construction, but in the form illustrated in Fig. 4 said radiator is of a type which embodies therein a plurality of thin horizontal plates 9 and a plurality of vertical tubes 10 which project downwardly through said plates.

The grille of this invention embodies a sheet of material, preferably of cardboard, rendered impervious to moisture and comprising a base 11, a top 12 and side portions 13 and 14 with diagonal strips 15 extending across the space enclosed within the base, top and side portions of the grille and thereby forming diamond-shaped spaces 16 between the diagonally extending strips 15. 17 represents the shield, which is also composed of cardboard preferably rendered impervious to moisture, and is folded transversely thereof and entirely thereacross to form a plurality of sections 18, 19, 20, 21, 22 and 23. The section 23 of the shield is permanently attached by adhesive to the base plate 11 of the grille. The other sections 18, 19, 20, 21 and 22 can be unfolded from the folded position illustrated in Fig. 2 so that one or more of these sections may be positioned between the diamond-shaped portions of said grille and the radiator, so that more or less of the area of the radiator may be covered as may be desired.

When the shield is in folded position as illustrated in Fig. 2 the grille and the shield are fastened to the radiator by fastening devices 24 which project through diagonally positioned slots 25, 25 in the upper portion of the grille and through diagonally positioned slots 26, 26 in the base of the grille. Said fastening devices 24 also project through all of the layers of the shield when the shield is folded as illustrated in Fig. 2 and into the spaces between the plates 9. The particular fastening device illustrated is the preferred form and is like the fastening device illustrated in Figs. 1 and 2 of the Patent No. 1,742,014 issued to me on December 31, 1929.

The fastening device 24 is inserted through the slots 26 in the base of the grille and when the shield is folded as in Fig. 2 it projects through similar slots provided in said shield and between the plates 9, being pushed rearwardly within the spaces between the plates until the section 18 of the shield is in engagement with the front of the radiator. As the fastening device is pushed rearwardly within the radiator, the flaring sides of the body portion of the fastener will be compressed and will frictionally engage the plates 9 in a manner to securely hold the fastening device within the radiator and thus securely attach the shield and the grille to the radiator. The upper portion of the grille is attached in like manner to the radiator by fastening devices 24 which project through the angular slots 25 in the grille and between the plates 9 of the radiator.

In Fig. 3 the shield is shown as partly unfolded, that is, the sections 18, 19 and 20 have been drawn upwardly as illustrated and the section 18 secured to the radiator 7 by a fastening device 27 which is like the fastening device 24. The fastening device 27 projects through a slot 28 provided in the section 18 and positioned in the central portion of said section between the sides thereof. The fastening device 27 holds the section 18 firmly against the face of the radiator and is inserted through one of the diamond-shaped spaces 16 in the grille. If desired, slots similar to the slot 28 may be provided in the sections 19, 20, 21 and 22 and fastening devices inserted through each of these slots when the respective sections are unfolded from their lowermost position and positioned in front of the radiator behind the diamond-shaped spaces 16 of the grille.

In unfolding the shield from the folded position illustrated in Fig. 2, for example, to the partly unfolded position illustrated in Fig. 3, the fastening devices 24 may be removed from the diagonal slots 26 and the shield bent outwardly sufficiently to enable any number of different sections desired to be unfolded, or if desired, the grille may be entirely removed by removing the fastening devices 24 from the diagonal slots 26 and also from the diagonal slots 25. It will be seen that by making the slots 25 diagonal or inclined at an angle, the fastening devices 24 may be moved to different positions in order to align with the spaces between the plates 9.

I claim:
1. In combination, a grille adapted to be fastened to the radiator of an automobile, and a shield for said radiator interposed between the grille and radiator and embodying a single sheet of material creased transversely thereof and folded to form a plurality of sections and fastened to said grille.

2. In combination, a grille adapted to be fastened to the radiator of an automobile, and a shield for said radiator interposed between the grille and radiator and embodying a single sheet of paper impervious to moisture creased transversely thereof and folded to form a plurality of sections, the lowermost section of said shield being fastened to said grille, and other means to fasten any of the other sections to said radiator.

In testimony whereof I have hereunto set my hand.

GEORGE L. SMITH.